(12) United States Patent
Avidan et al.

(10) Patent No.: US 12,420,230 B1
(45) Date of Patent: Sep. 23, 2025

(54) WATER GENERATION UNIT AND SYSTEM

(71) Applicant: AVIDANS TECH HOLDINGS LTD, Nicosia (CY)

(72) Inventors: Guy Avidan, Tel Aviv (IL); Itai Shamir, Binyamina (IL)

(73) Assignee: AVIDANS TECH HOLDINGS LTD, Nicosia (CY)

( * ) Notice: Subject to any disclaimer, the term of this patent is extended or adjusted under 35 U.S.C. 154(b) by 0 days.

(21) Appl. No.: 19/261,375

(22) Filed: Jul. 7, 2025

(51) Int. Cl.
*B01D 53/04* (2006.01)
*B01D 53/26* (2006.01)

(52) U.S. Cl.
CPC ....... *B01D 53/261* (2013.01); *B01D 53/0438* (2013.01); *B01D 53/0446* (2013.01); *B01D 53/0462* (2013.01); B01D 2253/108 (2013.01); B01D 2257/80 (2013.01); B01D 2259/4525 (2013.01); B01D 2259/802 (2013.01); B01D 2259/804 (2013.01)

(58) Field of Classification Search
CPC .. B01D 53/04; B01D 53/261; B01D 53/0438; B01D 53/0446; B01D 53/0462; B01D 2253/108; B01D 2257/08; B01D 2259/4525; B01D 2259/802; B01D 2259/804
USPC ..... 96/121, 126–128, 130, 143, 146; 95/117
See application file for complete search history.

(56) References Cited

U.S. PATENT DOCUMENTS

| | | | |
|---|---|---|---|
| 2,083,732 A * | 6/1937 | Moore | B01D 53/261 165/4 |
| 5,846,296 A | 12/1998 | Krumsvik | |
| 6,863,711 B2 * | 3/2005 | Tongue | B01D 53/0462 96/111 |
| 7,866,176 B2 | 1/2011 | Vetrovec et al. | |
| 8,506,764 B2 * | 8/2013 | Chevrette | B01D 5/0018 202/185.1 |
| 10,835,861 B2 | 11/2020 | Friesen et al. | |
| 11,059,838 B2 | 7/2021 | Yaghi et al. | |

(Continued)

FOREIGN PATENT DOCUMENTS

| | | |
|---|---|---|
| CN | 201506994 U | 6/2010 |
| CN | 101629875 B | 8/2012 |
| JP | 2019122919 A | 7/2019 |

*Primary Examiner* — Frank M Lawrence, Jr.
(74) *Attorney, Agent, or Firm* — The Roy Gross Law Firm, LLC; Roy Gross

(57) ABSTRACT

A water generation unit configured to extract water from ambient air is provided. The water generation unit comprises a housing defining therewithin an extraction chamber, and comprising one or more sidewalls defining a housing opening, the housing further comprises a liquid-passable housing bottom comprising a perforated plate configured to support thereon a thermoresponsive sorbent medium; an air-supply arrangement configured to introduce ambient air into the extraction chamber via the housing opening, the air-supply arrangement comprising a circulation device configured to create an airflow into the extraction chamber from the ambient air; a heating arrangement configured to facilitate heating of the extraction chamber by solar radiation impinging thereon; and an accumulation arrangement comprising an accumulation element disposed below the housing bottom, the accumulation element being configured to facilitate accumulation of water which passes from the extraction chamber through the perforated plate.

20 Claims, 4 Drawing Sheets

(56) References Cited

U.S. PATENT DOCUMENTS

| | | | |
|---|---|---|---|
| 11,524,259 B2 * | 12/2022 | Dekoninck | E03B 3/28 |
| 11,814,820 B2 * | 11/2023 | Friesen | E03B 3/28 |
| 2003/0019358 A1 * | 1/2003 | Slaymaker | B01D 53/261 95/117 |
| 2009/0025711 A1 * | 1/2009 | Edwards | A01G 9/246 95/126 |
| 2022/0064913 A1 | 3/2022 | Wang et al. | |
| 2025/0043971 A1 * | 2/2025 | Gabig | E03B 3/28 |

* cited by examiner

WATER GENERATION UNIT AND SYSTEM

TECHNICAL FIELD

The presently disclosed subject matter relates to devices and systems configured to extract water from ambient air, in particular devices and systems which are configured to function with little or no external power.

BACKGROUND

Water scarcity presents significant challenges, particularly in regions in which reliable access to clean water is limited. Traditional water supply methods often rely on surface or groundwater sources, which may be unavailable, contaminated, or difficult to access in certain environments. Additionally, transporting water over long distances can be costly, logistically complex, and environmentally unsustainable.

Extracting water from atmospheric moisture may address some of the issues involved with traditional water supply methods. The ability to extract water directly from the air could be part of a sustainable and decentralized solution for water supply, potentially serving a variety of applications including residential, agricultural, industrial, and emergency use.

SUMMARY OF THE INVENTION

According to an aspect of the presently disclosed subject matter, there is provided a water generation unit configured to extract water from ambient air, the water generation unit comprising:
  a housing defining therewithin an extraction chamber, the housing comprising one or more sidewalls defining a housing opening, the housing further comprising a liquid-passable housing bottom comprising a perforated plate configured to support thereon a thermoresponsive sorbent medium;
  an air-supply arrangement configured, in a supply position thereof, to introduce ambient air into the extraction chamber via the housing opening, the air-supply arrangement comprising a circulation device configured to create an airflow into the extraction chamber from the ambient air;
  a heating arrangement configured, in a heating position thereof, to facilitate heating of the extraction chamber; and
  an accumulation arrangement comprising an accumulation element disposed below the housing bottom, the accumulation element being configured to facilitate accumulation of water which passes from the extraction chamber through the perforated plate.

The housing may comprise a housing opening, wherein:
  the air-supply arrangement further comprises a supply cover configured to selectively bring the air-supply arrangement into its supply position by being moved into registration with the housing opening, thereby closing it; and
  the heating arrangement comprises a heating cover configured to selectively bring the heating arrangement into its heating position by being moved into registration with the housing opening, thereby closing it.

The supply cover and/or the heating cover may be hingedly articulated to the housing.

The air-supply arrangement may further comprise a supply actuator configured to selectively move the supply cover into and out of registration with the housing opening; and the heating arrangement may comprise a heating actuator configured to selectively move the heating cover into and out of registration with the housing opening.

The air-supply arrangement may further comprise a support structure configured, in the supply position, to dispose the circulation device such that an air outlet thereof is spaced from the housing opening.

The support structure may be formed as a frustrum, the base of the frustrum being disposed at the housing opening, and the air outlet of the circulation device being disposed at the top of the frustrum.

The heating arrangement may be configured to facilitate heating of the extraction chamber by utilizing solar radiation impinging thereon.

The heating arrangement may comprise a window opening sealingly closed by a substantially transparent window panel configured to allow solar radiation impinging thereon to heat the extraction chamber.

The window panel may comprise one or more glass sheets.

The window panel may comprise one or more optical coatings configured to increase the transmission of solar radiation therethrough.

The window panel may comprise a transparent photovoltaic panel.

The heating arrangement may further comprise a solar thermal absorber configured to be disposed within the extraction chamber, the solar thermal absorber configured to convert solar radiation impinging thereon into heat, and to release the heat into the extraction chamber.

The solar thermal absorber may be made of a thermally permeable material.

The accumulation arrangement may further comprise a trough, the accumulation element being configured such liquid accumulated therein drains into the trough.

The water generation unit may comprise the thermoresponsive sorbent medium.

The thermoresponsive sorbent medium may be arranged on the perforated plate in a sorbent layer, the sorbent layer being configured to provide fluid paths for water to flow therethrough to the perforated plate.

The thermoresponsive sorbent medium may comprise a zeolite material. The zeolite material may comprise a 13X zeolite, an AQSOA zeolite, a LiX zeolite, a NaX zeolite, and HBEA zeolite, and/or a 3A zeolite.

The thermoresponsive sorbet medium may comprise a metal-organic framework, a hygroscopic hydrogel, and/or a covalent-organic framework.

According to another aspect of the presently disclosed subject matter, there is provided a water generation system comprising:
  one or more water generation units, each as described above;
  a water storage arrangement comprising one or more storage units, and being configured to store therein water extracted by the one or more water generation units; and
  a collection arrangement in fluid connection with the accumulation arrangements of the one or more water generation units and with the water storage arrangement, the collection arrangement comprising one or more pumps configured to facilitate collection of water from the water generation units and storage thereof in the one or more storage units.

The water generation system may further comprise a power arrangement configured to provide electrical power to operate the circulation devices of the one or more water generation units and/or the one or more pumps of the collection arrangement.

The power arrangement may comprise an energy storage arrangement.

The water generation system may further comprise one or more power units configured to generate power from a renewable power source.

The power units may be configured to charge the energy storage arrangement.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1A:
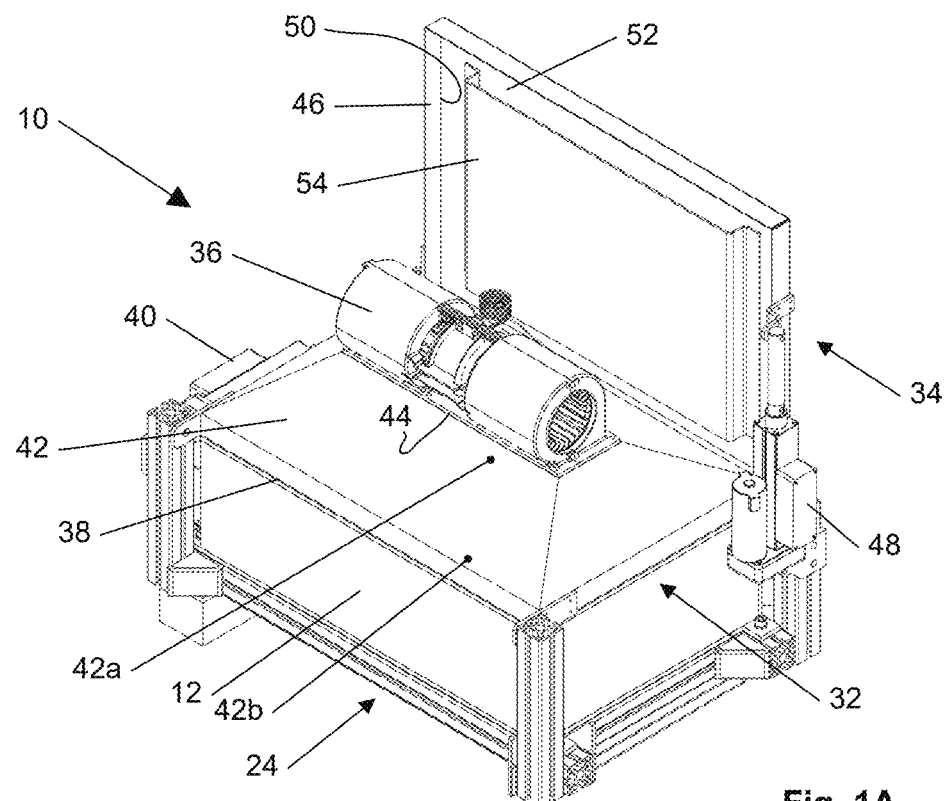
FIGS. 1A and 1B are perspective views of a water generation unit according to the presently disclosed subject matter, in nighttime and daytime configurations, respectively.
Figure 1B:
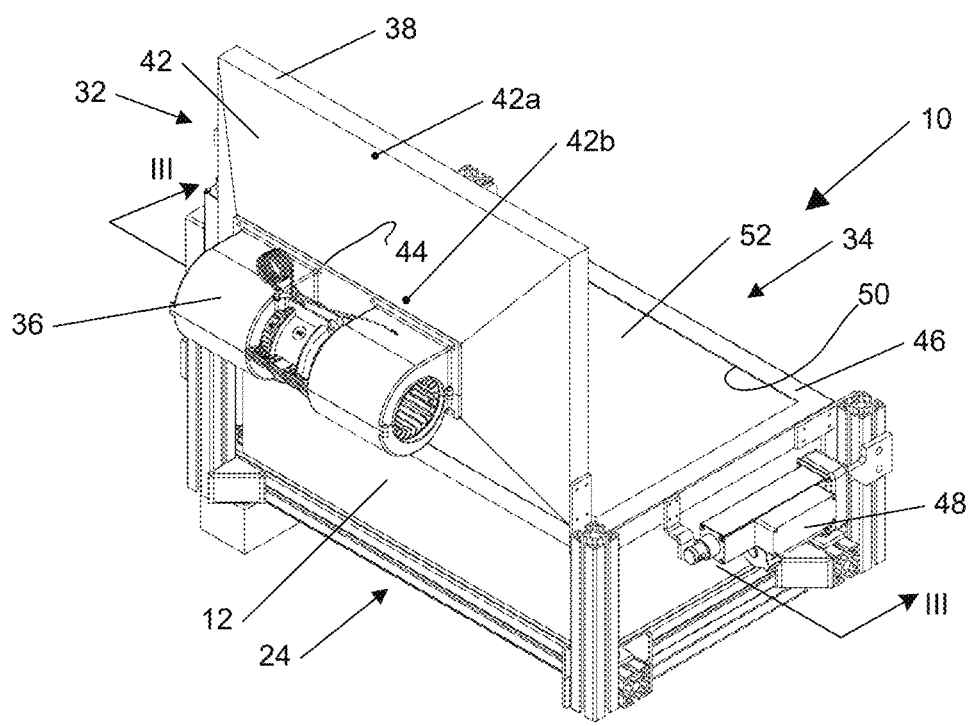

As illustrated in FIGS. 1A and 1B, there is provided a water generation unit, which is generally indicated at 10, configured to extract water from ambient air. According to some examples, the water generation unit 10 extracts water from ambient air by capturing it in a sorbent medium and subsequently releasing it.

As will be described below, the water generation unit 10 is configured to be operated in a nighttime configuration—for example as illustrated in FIG. 1A—in which it operates to capture water from ambient air in a sorbent medium, and in a daytime configuration—for example as illustrated in FIG. 1B—in which it operates to release the captured water from the sorbent medium for accumulation and use.

It will be appreciated that the terms "nighttime configuration" and "daytime configuration" are used for clarity of disclosure and have been chosen based on a typical usage of the water generation unit 10 as described herein with reference to and illustrated in the accompanying figures, and are not to be construed as limiting to operation at particular hours and/or times of the day, as limiting to a structure which is configured for operation at particular hours and/or times of the day, etc.

The water generation unit 10 may be configured to operate to extract the water using low power. According to some examples, one or more of such water generation units 10 may be part of a water generation system configured to provide the necessary power from a renewable energy source, such that the system can operate without being connected to an external source of power (e.g., a local electrical power grid).

Figure 2:
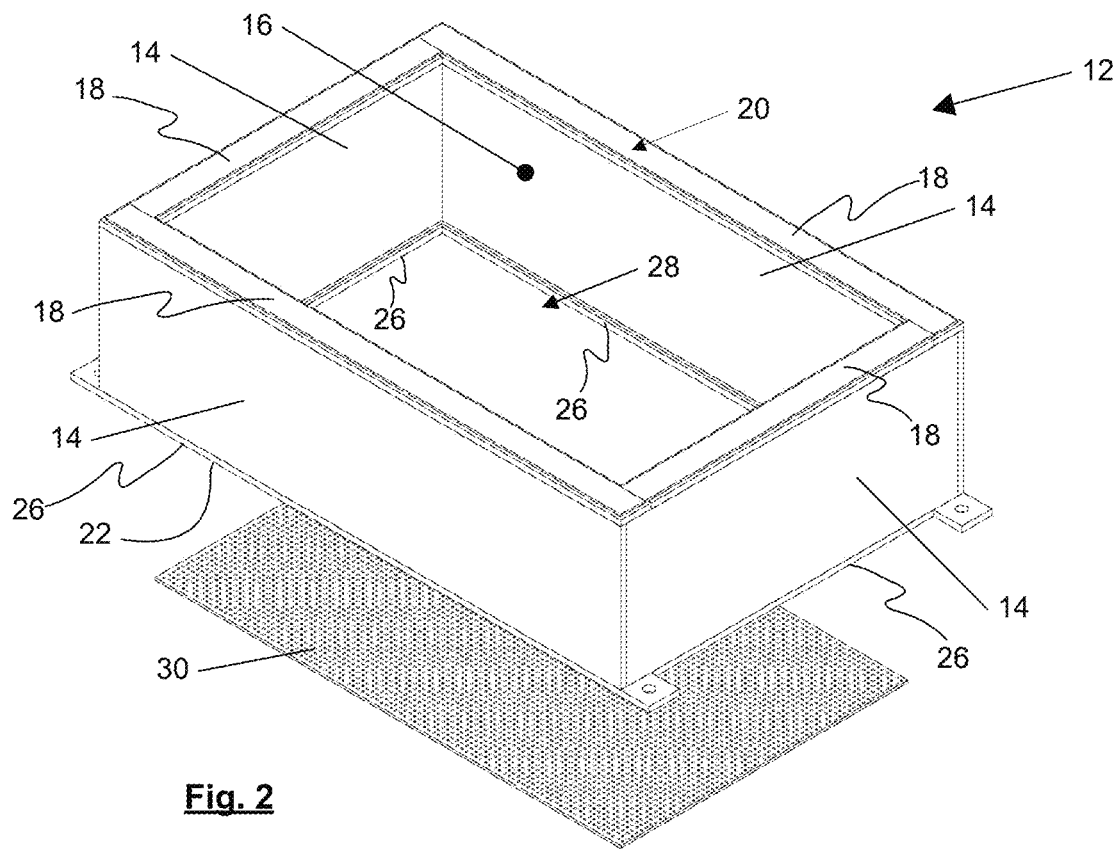
FIG. 2 is a perspective exploded view of a housing of the water generation unit illustrated in FIGS. 1A and 1B.

As illustrated in FIG. 2, the water generation unit 10 comprises as housing 12, for example comprising a plurality of sidewalls 14 defining an extraction chamber 16 therewithin. Upper edges 18 of the sidewalls 14 define a housing opening 20. The housing 12 further comprises a housing bottom 22 at a lower side thereof. The water generation unit further comprises an accumulation arrangement 24 (seen in FIGS. 1A and 1B) disposed at least in part below the housing bottom 22.

The housing bottom 22 is configured to allow liquids to pass therethrough. Accordingly, lower edges 26 of the sidewalls 14 may define a discharge aperture 28. A perforated plate 30 is provided within the discharge aperture 28 for supporting thereon a thermoresponsive sorbent medium, and being configured to allow passage therethrough of liquid, as will be described below.

Reverting to FIGS. 1A and 1B, the water generation unit 10 comprises an air-supply arrangement, which is generally indicated at 32, and a heating arrangement, which is generally indicated at 34. The water generation unit 10 may further comprise a controller (not illustrated), configured to direct operation of one or more elements of the water generation unit.

The air-supply arrangement 32 is configured to facilitate introduction of ambient air into the extraction chamber 16 via the housing opening 20. According to some examples, it comprises a circulation device 36, for example comprising a fan, such as a centrifugal fan, or any other suitable mechanism, configured to create an airflow of ambient air into the extraction chamber 16 via the housing opening 20.

According to some examples, the air-supply arrangement 32 comprises a supply cover 38, carrying the circulation device 36 and being configured to be moved between a supply position (as illustrated in FIG. 1A) in the nighttime configuration of the water generation unit 10, in which the air-supply arrangement is configured to introduce ambient air into the extraction chamber 16. In the supply position of the air-supply arrangement 32, the supply cover 38 lies in registration with the housing opening 20, thereby closing it.

According to some examples, the supply cover 38 is hingedly articulated to the housing 12.

The air-supply arrangement 32 may further comprise a supply actuator 40 (only partially seen in FIGS. 1A and 1B; however, the supply actuator 40 may be similar to the heating actuator 48 described below), which may be any suitable device or arrangement configured to selectively move the supply cover 38 between the supply position of the air-supply arrangement, i.e., in which the supply cover lies in registration with the housing opening 20, and a non-supply position in which the supply cover is removed, e.g., pivoted away, from the housing opening (as illustrated in FIG. 1B).

According to some examples, the air-supply arrangement 32 may further comprise a support structure 42 configured to dispose the circulation device 36 above the housing opening 20, i.e., such that an air outlet 44 thereof is spaced from the housing opening. This may be useful, e.g., to improve the airflow generated by the circulation device 36 within the extraction chamber 16, for example to facilitate increased uniformity of the rate of airflow provided by the circulation device 36 across the sorbent medium on the perforated plate 30. The support structure 42 may have any suitable shape, including, but not limited to, a frustrum—such as a truncated pyramid (for example as shown) or a truncated cone—in which the base 42a thereof lies in registration with the upper edges 18 of the sidewalls 14, and the air outlet 44 of the circulation device 36 lies in registration with the top 42b thereof. The supply cover 38 may comprise or constitute the support structure 42, for example as illustrated in FIGS. 1A and 1B.

The heating arrangement 34 may be configured to facilitate heating of the extraction chamber 16, e.g., by utilizing solar radiation impinging thereon.

According to some examples, the heating arrangement 34 comprises a heating cover 46, configured to be moved between a heating position (as illustrated in FIG. 1B) in the daytime configuration of the water generation unit 10, in which the heating arrangement is configured to facilitate the use of solar radiation to heat the extraction chamber 16. In the heating position of the heating arrangement 34, the heating cover 46 lies in registration with the housing opening 20, thereby closing it.

According to some examples, the heating cover 46 is hingedly articulated to the housing 12.

The heating arrangement 34 may further comprise a heating actuator 48, which may be any suitable device or arrangement configured to selectively move the heating cover 46 between the heating position of the heating arrangement, i.e., in which the heating cover lies in registration with the housing opening 20, and a non-heating position in which the heating cover is removed, e.g., pivoted away, from the housing opening (as illustrated in FIG. 1A).

The controller may be configured to operate the actuators 40, 48, for example as described below, based on one or more factors, which may include, but are not limited to, the positions of each of the air-supply arrangement 32 and heating arrangement 34 (e.g., based on the state and/or prior operation of their respective actuators), the temperature and/or humidity of the extraction chamber 16, the ambient temperature and/or humidity, the time of day and/or year, a predefined schedule, the amount of water captured in the sorbent medium (e.g., based on its weight), the amount of incident solar radiation, etc. The water generation unit 10 may further comprise any suitable sensors (not illustrated) required to collect the relevant information.

Figure 3:
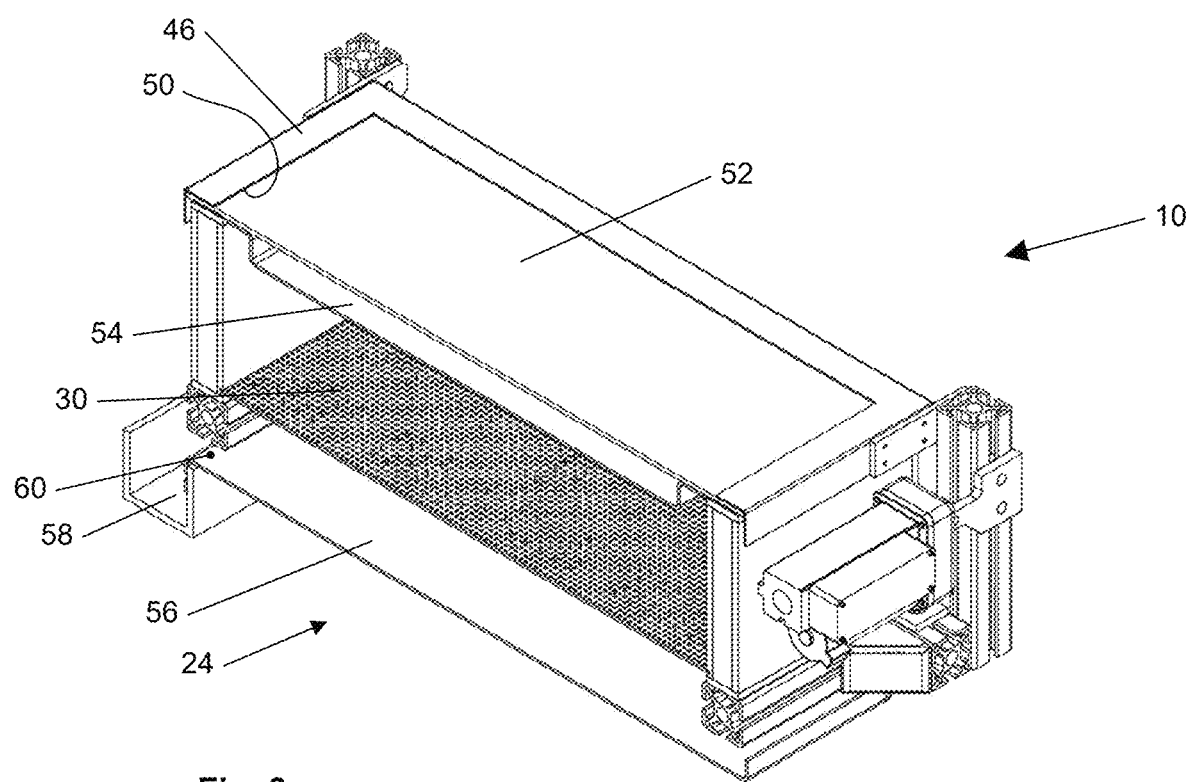
FIG. 3 is a perspective cross-sectional view of the water generation unit, taken along line III-III in FIG. 1B.

As illustrated in FIG. 3, according to some examples, the heating cover 46 comprises a window opening 50 sealingly closed by a substantially transparent window panel 52, configured to facilitate solar irradiation impinging thereon to heat the extraction chamber 16.

It will be appreciated that term "substantial transparent" when used herein the specification and appended claims with reference to the window panel 52 is to be interpreted as encompassing more than may be per a strict definition of transparency. In particular, "substantially transparent" refers to the property according to which a sufficient amount of solar radiation passes therethrough to heat the extraction chamber 16 to the extent required to release the captured water from the sorbent medium. According to some examples, a window panel which is configured to allow most or all of the impinging solar radiation which will increase the temperature pass therethrough, e.g., having a high reflectivity of wavelengths which do not significantly contribute to heating, may be considered to be substantially transparent. According to, a window panel which allows light to pass therethrough but diffuses it such that details are obscured (sometimes referred to as "translucent") and/or which is tinted may be considered to be substantially transparent.

The window panel 52 may be made of any suitable material. According to some examples, it comprises one or more sheets made of glass, a polymer, and/or any one suitable material or combination of materials, for example as is known in the art. According to some examples, the window panel 52 comprises a single sheet substantially filling the entire area of the window opening 50, or a plurality of sheets arranged alongside one another to fill the entire area of the window opening 50 and being sealed therebetween. According to some examples, the window panel 52 comprises a plurality of sheets arranged as layers.

The window panel 52 may comprise any one or more coatings, for example as is known in the art, such as optical coatings configured to increase transmission of light through the window panel. Such coatings may be configured, e.g., to reduce the reflectivity of the outwardly facing (i.e., top) surface of the window panel 52, to increase the reflectivity of the inwardly facing surface of the window panel, etc.

According to some examples, the window panel 52 may comprise a transparent photovoltaic panel, i.e., a panel configured to generate electricity from impinging solar radiation while allowing a portion thereof to pass therethrough, for example as is known in the art. The transparent photovoltaic panel may constitute the entire window panel 52 or a portion thereof.

According to some examples, the heating cover 46 may further comprise a solar thermal absorber 54 disposed below the window panel 52, i.e., within the extraction chamber 16 at least when the heating arrangement 34 is in its heating position. The solar thermal absorber is configured to absorb solar radiation which enters the extraction chamber 16 and convert it to heat, and to subsequently release the heat into the extraction chamber. Accordingly, it functions as a heat exchanger between the solar radiation and the extraction chamber 16.

The solar thermal absorber 54 may comprise one or more layers. Each of the layers may be mode of any suitable material for example as is known in the art, including, but not limited to, a metal, a metal alloy, a polymer, etc. According to some examples, at least some of the layers of the solar thermal absorber 54 is made of a thermally permeable material for example as is known in the art, including, but not limited to, a porous ceramic such as silicon carbide, a metal foam made of, e.g., aluminum and/or copper, a porous polymer, and/or a suitable material formed as a honeycomb structure. According to examples in which the solar thermal absorber 54 comprises more than one layer, each of the layers may be made of a different material, for example as is known in the art.

Some or all of the layers may comprise one or more suitable coatings, for example as is known in the art, to increase the amount of solar radiation absorbed thereby or to otherwise improve performance of the solar thermal absorber 54. According to some examples, at least the uppermost surface of the solar thermal absorber is black or painted black.

The accumulation arrangement 24 is configured to facilitate accumulation of water extracted from the ambient air, in particular accumulation of captured water which is released from the sorbent medium. As further illustrated in FIG. 3, the accumulation arrangement 24 comprises an accumulation element 56 disposed below the discharge aperture 28 of the housing bottom 22, for example directly below the perforated plate 30, such that extracted water which drips, flows, etc., from the sorbent material (i.e., through the perforated plate 30 and via the discharge aperture 28) lands on it. The accumulation arrangement 24 further comprises an accumulation trough 58 configured to accumulate extracted water therein.

According to some examples, the accumulation element 56 comprises a tray or other suitably flat or smooth (e.g., including non-flat surfaces such as curved surfaces, etc.) surface, positioned such that liquids thereupon flow toward an outflow edge 60 thereof, which is located adjacent to or above the accumulation trough 58. According to some examples, the accumulation element 56 is angled downwardly toward the outflow edge 60.

The other edges of the accumulation element 56 may be in contact, directly or indirectly, with lower edges 36 of the sidewalls 14 of the housing 12, thereby providing a degree of separation between water on the accumulation element 56 and the external environment.

Figure 4:
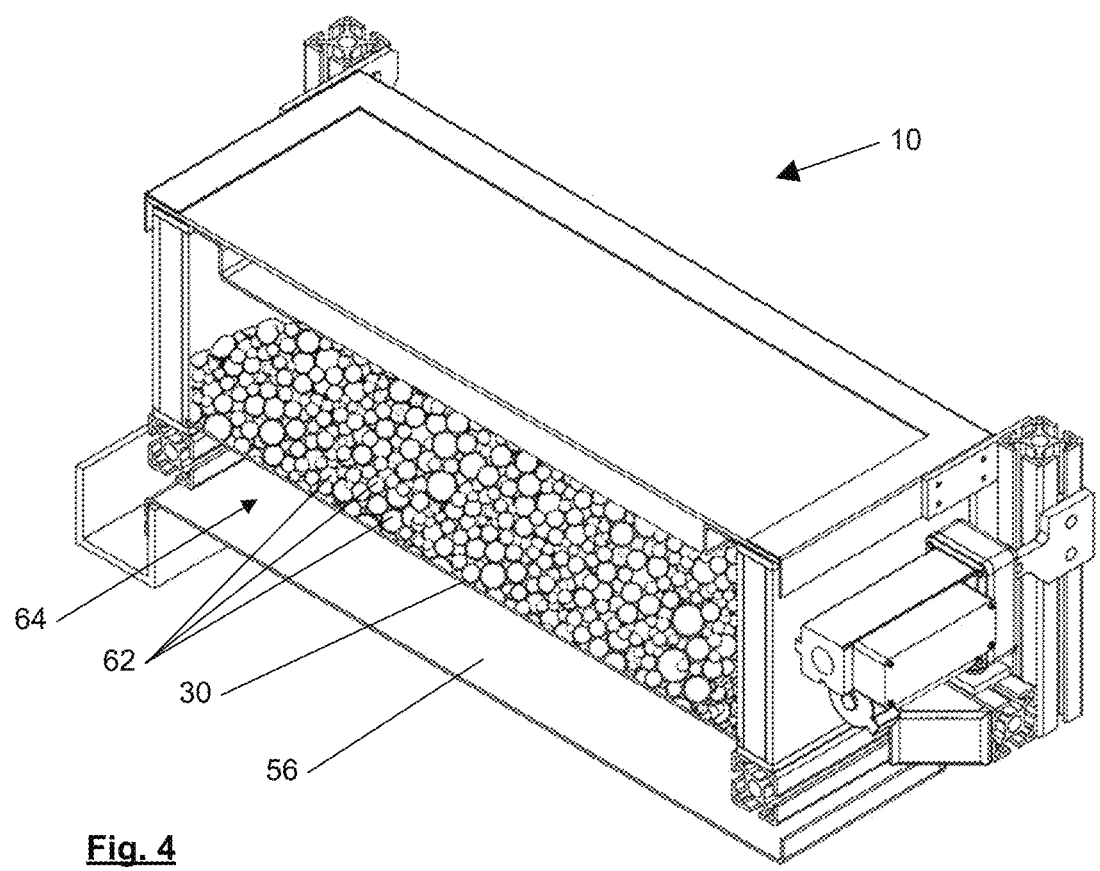
FIG. 4 is the perspective cross-sectional view of FIG. 3, with thermoresponsive sorbent medium therein.

As seen in FIG. 4, the thermoresponsive sorbent medium 62 is provided on the perforated plate, constituting a sorbent layer 64. The sorbent layer 64 is configured, e.g., by the arrangement of the thermoresponsive sorbent medium 62 therein, to provide fluid paths for flow therethrough of water to the perforated plate 30, so that it may discharged and accumulated by the accumulation arrangement 24 for example as described above. The fluid paths allow water which was captured by portions of the thermoresponsive sorbent medium located, e.g., at the upper and/or middle portions of the sorbent layer 64 to flow downwardly toward the perforated plate.

According to some examples, the thermoresponsive sorbent medium is provided as a plurality of small solid units, for example being spherical or substantially spherical. The small solid units may be shaped such that when arranged in a pile (such as sorbent layer 64), gaps remain therebetween, thereby constituting the fluid paths. According to some examples, the small solid units may be generally spherical in shape. The small solid units may be sized such that they are larger than the perforations of the perforated plate 30 to prevent them falling therethrough.

According to some examples, the thermoresponsive sorbent medium is provided as one or more blocks formed with vertically extending channels defining the fluid paths.

The thermoresponsive sorbent medium 62 may be any suitable material configured to undergo a reversible change in its ability to adsorb and desorb water in response to variations in temperature. In particular, the thermoresponsive sorbent medium 62 is configured to configured to adsorb water when at temperatures which are typical for the extraction chamber 16 during nighttime use of the water generation unit 10, and to desorb water at elevated temperatures which are typical for the extraction chamber during daytime use, as will be described below.

According to some examples, the thermoresponsive sorbent medium 62 may comprise a zeolite material, for example comprising a 13X zeolite, an AQSOA zeolite, a LiX zeolite, a NaX zeolite, an HBEA zeolite, and/or a 3A zeolite. According to some examples, the thermoresponsive sorbet medium comprises a metal-organic framework, a hygroscopic hydrogel, and/or a covalent-organic framework.

In use, the water generation unit 10 captures water from ambient air, typically at night, in its nighttime configuration, and releases and accumulates the captured water, typically during the daytime, in its daytime configuration, as mentioned above, and for example as described below.

In the nighttime configuration, the air-supply arrangement 32 is in its supply position, i.e., the housing opening 20 is closed by the supply cover 38, and the heating arrangement 34 is in its non-heating position, i.e., the heating cover 46 is pivoted above from the housing opening. The circulation device 36 is operated to create an airflow to bring ambient air into the extraction chamber 16 via the housing opening 20, pass through the sorbent layer 64, and exit the extraction chamber via the perforated plate 30. Typically, as the water generation unit 10 is not subject to being heated by solar radiation at night, the temperature of the extraction chamber 16 is expected to be low enough for the thermoresponsive sorbent medium 62 to exhibit adsorptive properties. Accordingly, it captures water from the air passing through the fluid paths of the sorbent layer 64. The amount of thermoresponsive sorbent medium 62 provided may be selected to optimize the amount of water collected over the course of a typical night.

To transition from the nighttime configuration to the daytime configuration, the air-supply arrangement 32 is brought into its non-supply position, i.e., the supply cover 38 is pivoted away from the housing opening 20, and the heating arrangement 34 is brought into its heating position, i.e., the heating cover 46 is pivoted onto the housing opening such that it closes it. This may be accomplished by the supply and/or heating actuators 40, 48, for example under direction of the controller.

In the daytime configuration, the water generation unit 10 is impinged upon by solar radiation, which passed into the extraction chamber 16 via the window panel 52 of the heating cover 46. It is absorbed by the solar thermal absorber 54, which absorbs it and converts it to heat, for example downwardly toward the sorbent layer 64 therebelow. The sorbent layer 64 may be configured to prevent in part to loss of heat via the perforated plate 30. The elevated temperature of the extraction chamber 16 causes the thermoresponsive sorbent medium 62 to exhibit desorptive properties. Accordingly, water which was captured thereby when the water generation unit 10 was operating in its nighttime configuration, for example as described above, is released from the thermoresponsive sorbent medium 62, and descends through the fluid paths of sorbent layer 64. It will be appreciated that while the released water, in particular the water released from upper layers of the sorbent layer 64, may be re-adsorbed by thermoresponsive sorbent material 62 therebelow, this is only temporary, as much or all of it is expected to be released as the temperature of the extraction chamber 16 increases. The released water descends through the perforated layer 30 and is accumulated by the accumulation arrangement 24, for example as described above.

To transition from the daytime configuration to the nighttime configuration, the air-supply arrangement 32 is brought into its supply position, i.e., the supply cover 38 is pivoted onto the housing opening 20 such that it closes it, and the heating arrangement 34 is brought into its non-heating position, i.e., the heating cover 46 is pivoted away from the housing opening. This may be accomplished by the supply and/or heating actuators 40, 48, for example under direction of the controller. Operation continues as described above with reference to the nighttime configuration.

As mentioned above, the terms "nighttime configuration" and "daytime configuration," as well as other descriptions herein to night and/or daytime, are not to be construed as limiting to particular hours and/or times of the day. For example, the controller may be configured to temporarily operate the water generation unit 10 in the nighttime configuration during the day, for example if it determines that there is a sufficiently low amount of water captured in the sorbent layer 64, e.g., based on the remaining amount of sunlight in the day, thereby allowing extraction of additional water from the ambient air, etc.

It will be appreciated that the water generation unit 10 as described above is not to be construed as limiting. In practice, one or more features, combinations of features, etc., thereof may be different than as described herein and illustrated in the accompanying figures, for example as per the following non-limiting modifications.

According to some modifications, the heating arrangement 34 may comprise one or more non-solar heating means for heating the extraction chamber 16, including, but not limited to, an infrared radiant heater, a forced and/or natural convection heater, a heat pump, a storage heater, etc. The non-solar heating means may be provided instead of or in addition to the solar-based heating means described above. According to some examples, the controller is configured to determine which one or more heating means to activate based on relevant factors, including, but not limited to, availability of solar radiation, availability of external power, amount of water captured in the sorbent medium, etc.

According to some modifications, the water generation unit is not convertible between nighttime and daytime configurations. Rather, an air-supply arrangement may be fixed in place over a first housing opening—which may be provided at any suitable location on the housing, e.g., within a sidewall, etc.—and a heating arrangement may be fixed in place over a second housing opening, for example similar to as described above. The air-supply arrangement is activated to bring ambient air into the extraction chamber 16 at any suitable time, for example at night.

Figure 5:
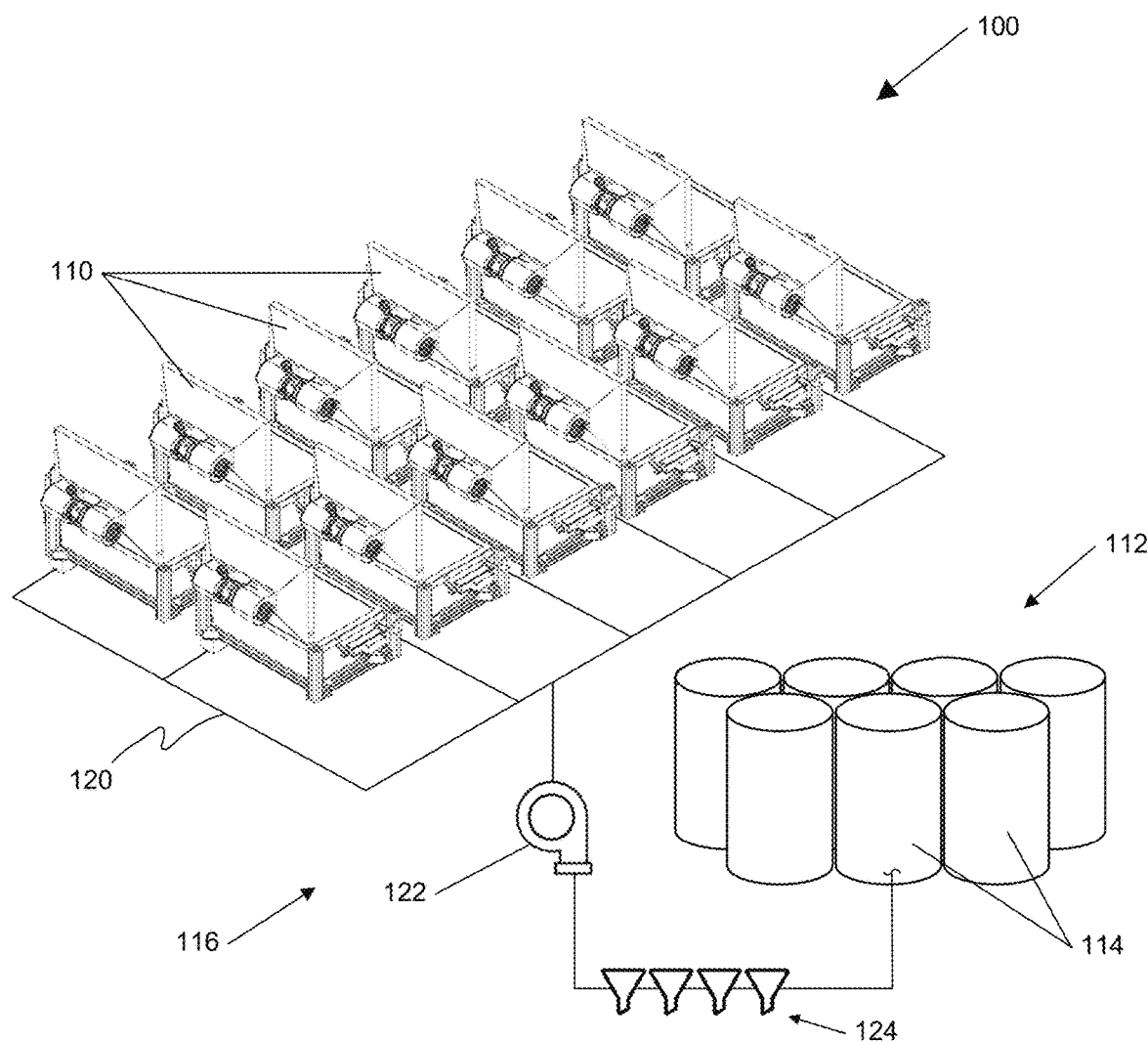
FIG. 5 is a schematic illustration of a water generation system according to the presently disclosed subject matter.

As illustrated in FIG. 5, there is provided a water generation system, which is generally indicated at 100, configured to extract water from the ambient air. The water generation system 100 comprises a plurality of water generation units 110 for example as described above, a water storage arrangement 112 comprising one or more storage units 114 for storage therein of water extracted by the water generation units, and a collection arrangement 116 configured to facilitate collection of water extracted by water generation units in the storage units for storage therein. The water generation system 100 may further comprise a power arrangement 118 configured to provide electrical power to operate components of the water generation system, for example the circulation devices of the water generation units 110, pumps of the collection arrangement 116, etc.

The collection arrangement 116 comprises a plurality of pipes 120 connected to accumulation arrangements (e.g., the accumulation troughs) of each of the water generation units 110, and to the one or more storage units 114 of the water storage arrangement 114, thereby providing a fluid path therebetween. It may further comprise one or more pumps 122 configured to facilitate collection of water from the water generation units 110, for example by moving the water through the pipes.

The collection arrangement 116 may further comprise a water treatment arrangement 124 disposed in the fluid path between the water generation units 110 and the water storage arrangement 114. The water treatment arrangement 124 may comprise one or more filters, one or more disinfection units, etc. According to some examples, the water treatment arrangement 124 comprises one or more coarse mesh filters, one or more activated carbon filter units, one or more microfiber filter units, one or more ultraviolet disinfection units, one or more chemical disinfection units, and/or any other suitable treatment units for example as is known in the art.

The power arrangement 118 may comprise one or more renewable power systems 126, each configured to generate power from a renewable power source. The renewable power systems 126 may comprise, e.g., one or more solar thermal collectors, one or more photovoltaic collectors, one or more wind turbines, one or more geothermal energy systems, and/or any other suitable arrangement for example as is known in the art for generating power from a renewable power source.

The power arrangement 118 may further comprise an energy storage arrangement 128, for example comprising an array or batteries, configured to store electrical power to be provided at a later time by the power arrangement. According to some examples, the energy storage arrangement 128 is configured to be charged by the renewable power systems 126, thereby facilitating, e.g., providing power to the circulation devices, actuators, etc., of the water generation units 110 during nighttime operation, and/or to any other components of the water generation system 110 when the renewable power systems 126 are unable to provide power. Accordingly, the water generation system 110 may be configured to operate without being connected to an external source of power, such as an electrical grid.

It will be appreciated that while herein the specification and claims the term "controller" is used with reference to a single element, it may comprise a combination of elements, which may or may not be in physical proximity to one another, without departing from the scope of the presently disclosed subject matter, mutatis mutandis. In addition, disclosure herein (including recitation in the appended claims) of a controller carrying out, being configured to carry out, or other similar language, implicitly includes other elements of the system 10 carrying out, being configured to carry out, etc., those functions—alone, in concert with the controller, in concert with other elements of the system, in concert with one or more external devices, etc.—without departing from the scope of the presently disclosed subject matter, mutatis mutandis.

It will be recognized that examples, embodiments, modifications, options, etc., described herein are to be construed as inclusive and non-limiting, i.e., two or more examples, etc., described separately herein are not to be construed as being mutually exclusive of one another or in any other way limiting, unless such is explicitly stated and/or is otherwise clear. Those skilled in the art to which this invention pertains will readily appreciate that numerous changes, variations, and modifications can be made without departing from the scope of the presently disclosed subject matter, mutatis mutandis.

The invention claimed is:

1. A water generation unit configured to extract water from ambient air, the water generation unit comprising:
    a housing defining therewithin an extraction chamber, the housing comprising one or more sidewalls defining a housing opening, the housing further comprising a liquid-passable housing bottom comprising a perforated plate configured to support thereon a thermo-responsive sorbent medium;
    an air-supply arrangement configured, in a supply position thereof, to introduce ambient air into the extraction chamber via the housing opening, the air-supply arrangement comprising a circulation device configured to create an airflow into the extraction chamber from the ambient air;
    a heating arrangement configured, in a heating position thereof, to facilitate heating of the extraction chamber; and
    an accumulation arrangement comprising an accumulation element disposed below the housing bottom, the accumulation element being configured to facilitate accumulation of water which passes from the extraction chamber through the perforated plate.

2. The water generation unit according to claim 1, wherein:
    the air-supply arrangement further comprises a supply cover configured to selectively bring the air-supply arrangement into its supply position by being moved into registration with the housing opening, thereby closing it; and the heating arrangement comprises a heating cover configured to selectively bring the heating arrangement into its heating position by being moved into registration with the housing opening, thereby closing it.

3. The water generation unit according to claim 2, wherein the supply cover and/or the heating cover are hingedly articulated to the housing.

4. The water generation unit according to claim 2, wherein:

the air-supply arrangement further comprises a supply actuator configured to selectively move the supply cover into and out of registration with the housing opening; and the heating arrangement comprises a heating actuator configured to selectively move the heating cover into and out of registration with the housing opening.

5. The water generation unit according to claim 1, the air-supply arrangement further comprising a support structure configured, in the supply position, to dispose the circulation device such that an air outlet thereof is spaced from the housing opening.

6. The water generation unit according to claim 5, the support structure being formed as a frustrum, the base of the frustrum being disposed at the housing opening, and the air outlet of the circulation device being disposed at the top of the frustrum.

7. The water generation unit according to claim 1, wherein the heating arrangement is configured to facilitate heating of the extraction chamber by utilizing solar radiation impinging thereon.

8. The water generation unit according to claim 7, wherein the heating arrangement comprises a window opening sealingly closed by a substantially transparent window panel configured to allow solar radiation impinging thereon to heat the extraction chamber.

9. The water generation unit according to claim 8, wherein the window panel comprises one or more glass sheets.

10. The water generation unit according to claim 8, wherein the window panel comprises one or more optical coatings configured to increase the transmission of solar radiation therethrough.

11. The water generation unit according to claim 8, wherein the window panel comprises a transparent photovoltaic panel.

12. The water generation unit according to claim 8, wherein the heating arrangement further comprises a solar thermal absorber configured to be disposed within the extraction chamber, the solar thermal absorber configured to convert solar radiation impinging thereon into heat, and to release the heat into the extraction chamber.

13. The water generation unit according to claim 12, wherein the solar thermal absorber is made of a thermally permeable material.

14. The water generation unit according to claim 1, the accumulation arrangement further comprising a trough, the accumulation element being configured such liquid accumulated therein drains into the trough.

15. The water generation unit according to claim 1, comprising the thermoresponsive sorbent medium.

16. The water generation unit according to claim 15, the thermoresponsive sorbent medium being arranged on the perforated plate in a sorbent layer, the sorbent layer being configured to provide fluid paths for water to flow therethrough to the perforated plate.

17. The water generation unit according to claim 15, wherein the thermoresponsive sorbent medium comprises a zeolite material.

18. The water generation unit according to claim 16, wherein the zeolite material comprises a 13X zeolite, an AQSOA zeolite, a LiX zeolite, a NaX zeolite, an HBEA zeolite, and/or a 3A zeolite.

19. The water generation unit according to claim 15, wherein the thermoresponsive sorbet medium comprises a metal-organic framework, a hygroscopic hydrogel, and/or a covalent-organic framework.

20. A water generation system comprising:

one or more water generation units according to claim 1;

a water storage arrangement comprising one or more storage units, and being configured to store therein water extracted by the one or more water generation units; and a collection arrangement in fluid connection with the accumulation arrangements of the one or more water generation units and with the water storage arrangement, the collection arrangement comprising one or more pumps configured to facilitate collection of water from the water generation units and storage thereof in the one or more storage units.

* * * * *